United States Patent
Brunel et al.

(10) Patent No.: US 8,135,411 B2
(45) Date of Patent: Mar. 13, 2012

(54) METHOD AND A DEVICE FOR DETERMINING AT LEAST ONE TERMINAL FOR WHICH SIGNALS TRANSFERRED BETWEEN THE AT LEAST ONE TERMINAL AND A BASE STATION OF A WIRELESS CELLULAR TELECOMMUNICATION NETWORK HAVE TO BE RELAYED BY A RELAY

(75) Inventors: Loic Brunel, Rennes Cedex (FR); David Mottier, Rennes Cedex (FR); Damien Castelain, Rennes Cedex (FR); Nicolas Gresset, Rennes Cedex (FR); Herve Bonneville, Rennes Cedex (FR)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 12/997,367

(22) PCT Filed: Jun. 9, 2009

(86) PCT No.: PCT/EP2009/057124
§ 371 (c)(1),
(2), (4) Date: Mar. 4, 2011

(87) PCT Pub. No.: WO2009/150161
PCT Pub. Date: Dec. 17, 2009

(65) Prior Publication Data
US 2011/0165879 A1 Jul. 7, 2011

(30) Foreign Application Priority Data
Jun. 11, 2008 (EP) .................................... 08158043

(51) Int. Cl.
*H04W 72/00* (2009.01)
(52) U.S. Cl. ........ 455/450; 455/3.04; 370/329; 370/315
(58) Field of Classification Search .................. 455/450, 455/3.04, 7; 370/329, 315, 259, 475, 330
See application file for complete search history.

(56) References Cited

U.S. PATENT DOCUMENTS

| | | | |
|---|---|---|---|
| 6,577,878 B1 | 6/2003 | Park et al. | |
| 2005/0030930 A1 | 2/2005 | Cho et al. | |
| 2008/0019321 A1 | 1/2008 | Kim et al. | |
| 2008/0045139 A1* | 2/2008 | Chen et al. | 455/3.04 |
| 2009/0059850 A1* | 3/2009 | Jung et al. | 370/329 |

FOREIGN PATENT DOCUMENTS

| EP | 1 503 544 | 2/2005 |
|---|---|---|
| WO | 95 11561 | 4/1995 |

OTHER PUBLICATIONS

International Search Report Issued Sep. 15, 2009 in PCT/EP09/057124 filed Jun. 9, 2009.
U.S. Appl. No. 12/996,956, filed Dec. 8, 2010, Brunel, et al.

* cited by examiner

*Primary Examiner* — Phuoc Doan
(74) *Attorney, Agent, or Firm* — Oblon, Spivak, McClelland, Maier & Neustadt, L.L.P.

(57) ABSTRACT

A method for determining at least one terminal for which signals transferred between the at least one terminal and a base station of a wireless cellular telecommunication network have to be relayed by a relay, the base station allocating resources of the wireless cellular telecommunication network. The method includes, executed by a management entity: receiving from the base station, information indicating to which terminal or terminals at least a part of the resources are allocated; receiving from the relay, a list of indicators of resources, and determining the at least one terminal for which signals transferred between the at least one terminal and the base station have to be relayed by the relay according to the information indicating to which terminal or terminals at least a part of the resources are allocated and to the list of indicators of resources.

13 Claims, 6 Drawing Sheets

METHOD AND A DEVICE FOR DETERMINING AT LEAST ONE TERMINAL FOR WHICH SIGNALS TRANSFERRED BETWEEN THE AT LEAST ONE TERMINAL AND A BASE STATION OF A WIRELESS CELLULAR TELECOMMUNICATION NETWORK HAVE TO BE RELAYED BY A RELAY

The present invention relates generally to a method and a device for determining at least one terminal for which signals transferred between the at least one terminal and a base station of a wireless cellular telecommunication network have to be relayed by a relay.

Future wireless cellular telecommunication network will use higher frequency bands than the ones used by current wireless cellular telecommunication networks.

New wireless cellular telecommunication networks, particularly in urban environment, will have dead zones, wherein the signals transferred between base stations and terminals will be highly attenuated.

By installing relays, it is possible to reduce the dead zones.

If it is not correctly controlled, the deployment of relays in a wireless cellular telecommunication network may degrade the overall system performance instead of enhancing it. Indeed, for a given cell, relays of other cells are potential new sources of interference for the given cell. These new sources of interference are added to the interference generated by other base stations.

The present invention aims at reducing interference generated by relays.

To that end, the present invention concerns a method for determining at least one terminal for which signals transferred between the at least one terminal and a base station of a wireless cellular telecommunication network have to be relayed by a relay, the base station allocating resources of the wireless cellular telecommunication network, characterised in that the method comprises the steps executed by a management entity of:

receiving from the base station, information indicating to which terminal or terminals at least a part of the resources are allocated, receiving from the relay, a list of indicators of resources, determining the at least one terminal for which signals transferred between the at least one terminal and the base station have to be relayed by the relay according to the information indicating to which terminal or terminals at least a part of the resources are allocated and to the list of indicators of resources.

The present invention concerns also a management entity able to determine at least one terminal for which signals transferred between the at least one terminal and a base station of a wireless cellular telecommunication network have to be relayed by a relay, the base station allocating resources of the wireless cellular telecommunication network, characterised in that the management entity comprises:

means for receiving from the base station, information indicating to which terminal or terminals at least a part of the resources are allocated, means for receiving from the relay, a list of indicators of resources, means for determining the at least one terminal for which signals transferred between the at least one terminal and the base station have to be relayed by the relay according to the information indicating to which terminal or terminals at least a part of the resources are allocated and to the list of indicators of resources.

Thus, by having a limited number of terminals for which signals transferred between the terminals and the base station have to be relayed, the interference generated by the relay is reduced.

Furthermore, it is not necessary for the relay, to be aware of which terminal the base station has allocated resources to. The exchange of information between the base station and the relay is then reduced.

According to a particular feature, the resources are physical resource blocks and/or reference signals.

Thus, when resources are physical resource blocks or physical resource blocks together with reference signals like as example pilot signals used for channel estimation at the receiver, observations are numerous and better estimation of specific parameters like the signal strength can be performed by the relay. Indeed, the higher the number of observations is, the lower the noise level in the estimate is. When resources are reference signals like pilot signals, the relay can take advantage of some specific reference signal properties, like the orthogonality of pilot signals for different terminals. Indeed, better parameter estimate can be obtained thanks to the reduction of interference from other signals, e.g., using orthogonality properties.

According to a particular feature, the management entity, prior to the reception of the list of indicators, transfers a sounding request to the relay.

Thus, the relay performs the sounding procedure only when it receives a sounding request. The relay does not perform continuously the sounding process, like the determination of a characteristic of the level of received signals on resources. Some hardware complexity and battery lifetime are saved.

Furthermore, the relay does not have to send the list of indicators continuously, the overhead of signalling between the relay and the management entity is reduced.

According to a particular feature, the list of indicators comprises M indicators of physical resource blocks on which a characteristic of the level of received signals measured by the relay are the M highest or the list of indicators comprises the indicators of each physical resource block on which the characteristic of the level of received signals measured by the relay is upper than a given value.

Thus, the management entity has information representative of real conditions which exist between at least one terminal and the relay.

According to a particular feature, the sounding request identifies at least one resource.

Thus, the relay doesn't need to sound any possible resource. Some hardware complexity and battery lifetime are saved.

Furthermore, the list of indicators might be reduced and the overhead of signalling between the relay and the management entity might be also reduced.

According to a particular feature, the list of indicators comprises M indicators of physical resource blocks identified in the sounding request on which a characteristic of the level of received signals measured by the relay are the M highest or the list of indicators comprises the indicators of each physical resource block identified in the sounding request on which the characteristic of the level of received signals measured by the relay is upper than a given value or the list of indicators comprises M indicators of reference signals identified in the sounding request on which a characteristic of the level of received reference signals measured by the relay are the M highest or the list of indicators comprises the indicators of each reference signal identified in the sounding request on which the characteristic of the level of received reference signals measured by the relay is upper than a given value.

Thus, the amount of transferred information is limited.

According to a particular feature, the list of indicators comprises characteristics of the level of received signals measured by the relay on at least a part of the physical resource blocks identified in the sounding request and/or characteristics of the level of at least a part of received reference signals which are identified in the sounding request.

Thus, thanks to this additional information, the management entity can determine more efficiently for which terminal signals transferred by the terminal and the base station, have to be relayed by the relay. Dead zones are reduced without increasing too much the interference generated by the relay.

For instance, if all characteristics of the level of received signals measured by the relay are very small, the management entity can decide that the relay does not relay any terminal since it would not improve system performance and reduce dead zones.

According to a particular feature, the list of indicators comprises the M highest characteristics of the level of received signals measured by the relay on the physical resource blocks identified in the sounding request or the M highest characteristics of the level of received reference signals which are identified in the sounding request or the M highest characteristics of the level of received reference signals identified in the sounding request measured by the relay on the physical resource blocks identified in the sounding request or the list of indicators comprises characteristics of the level of received signals measured by the relay on the physical resource blocks identified in the sounding request which are upper than a given value or the characteristics of the level of received reference signals which are identified in the sounding request which are upper than the given value or the characteristics of the level of received reference signals identified in the sounding request measured by the relay on the physical resource blocks identified in the sounding request which are upper than the given value.

Thus, thanks to this additional information, the management entity can determine more efficiently for which terminal signals transferred by the terminal and the base station, have to be relayed by the relay. Dead zones are reduced without increasing too much the interference generated by the relay.

Furthermore, the management entity has information representative of real conditions which exist between at least one terminal and the relay.

According to a particular feature, the resources are allocated for at least a time duration, information indicating to which terminal or terminals at least a part of the resources are allocated indicate to which terminal or terminals at least a part of the resources are allocated for the or each time duration and the list of indicators of resources is received for one or each time duration or for plural time durations.

Thus, the relay is able to determine some terminal-specific characteristics of the resource and perform appropriate processing. An estimation over all possible terminals is then not required and hardware complexity and battery lifetime can be saved.

Furthermore, the present invention is adapted to systems in which resources are continuously re allocated.

According to a particular feature, the information indicating to which terminal or terminals at least a part of the resources are allocated is information indicating to which terminal or terminals which experiences or experience bad data rates at least a part of the resources are allocated.

Thus, the relay only performs received signal strength estimation and reporting for terminals the performance of which has to be improved. The hardware complexity and battery lifetime can then be saved while ensuring performance improvement for terminals experiencing bad data rate.

According to a particular feature, the management entity transfers a message to the relay, the message comprising information enabling the relay to determine at least one terminal for which signals transferred between the at least one terminal and the base station have to be relayed by the relay.

According to still another aspect, the present invention concerns a computer program which can be directly loadable into a programmable device, comprising instructions or portions of code for implementing the steps of the method according to the invention, when said computer program is executed on a programmable device.

Since the features and advantages relating to the computer program are the same as those set out above related to the method and device according to the invention, they will not be repeated here.

The characteristics of the invention will emerge more clearly from a reading of the following description of an example embodiment, the said description being produced with reference to the accompanying drawings, among which.

Figure 1:
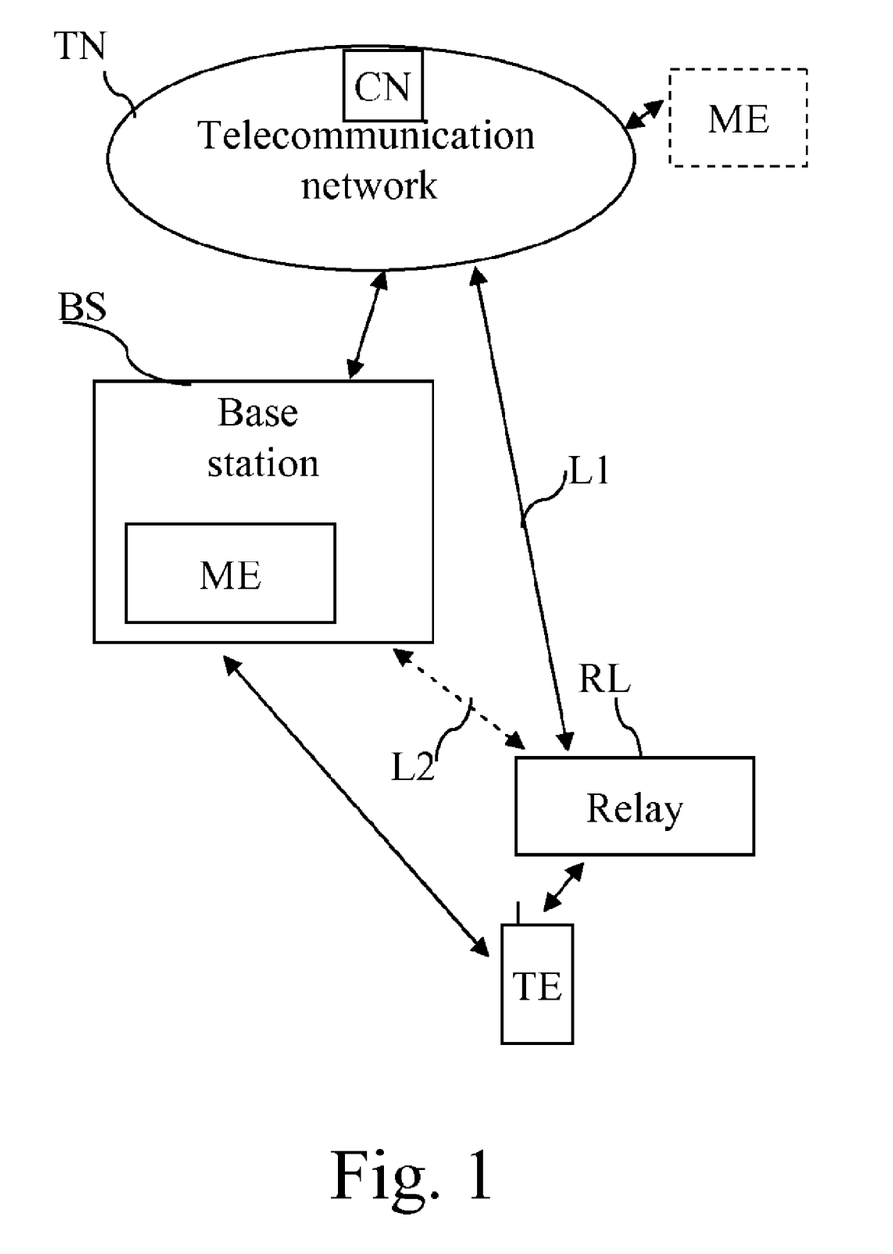
FIG. 1 represents the architecture of a wireless cellular telecommunication network in which the present invention is implemented.

In the wireless cellular telecommunication network, a base station BS transfers signals to at least one terminal TE handled by the base station BS.

The base station BS is also named an access node or a node B or an enhanced node B.

A base station BS handles a terminal TE when the base station BS has the information necessary for enabling the terminal TE to establish a communication with a remote device through the base station BS.

An area or a cell managed by a base station BS is an area in which the base station BS and a terminal TE can communicate.

The base station BS transfers signals to the terminal TE through a downlink channel and receives signals transferred by the terminal TE through an uplink channel.

In the FIG. 1, one relay RL is shown. The relay RL relays signals transferred between the base station BS and at least one terminal TE.

The relay RL receives signals transferred by the base station BS which handles the terminal TE to the terminal TE and transfers these signals to the terminal TE through the downlink channel and/or receives signals transferred by the terminal TE through the uplink channel and transfers these signals to the base station BS which handles the terminal TE.

It has to be noted here that the relay RL may also operate into different modes. For example, the relay RL may operate like a femto base station or in an idle mode as the idle mode known for terminals TE of classical wireless cellular telecommunication networks.

An idle mode is a mode wherein the relay RL doesn't relay any signal transferred between the base station BS and at least one terminal TE and doesn't transfer signals enabling the determination of position of the relay to any other devices of the wireless cellular telecommunication network.

The base station BS is connected to a telecommunication network TN which links each base station BS to core network devices CN which handle the operation of the wireless cellular telecommunication network.

The core network devices CN execute the same operation as classical core network devices in classical wireless cellular telecommunication networks.

In the FIG. 1, a management entity ME is shown. The management entity ME is included in at least one base station BS and manages plural relays included into at least one cell of the plural base stations BS.

In a variant, the management entity ME is not included in the base station BS and manages plural relays RL included into the cells of plural base stations BS linked to the management entity ME through the telecommunication network TN.

The management entity ME may also be named a relay controller.

The relay RL is linked to the telecommunication network TN through a wired link L1. Through the link L1, the relay RL and the management entity ME exchange messages.

In a variant, the relay RL is linked to the telecommunication network TN through the wired link between the base station BS and the telecommunication network and through a wireless link L2 between the base station BS and the relay RL.

In the FIG. 1, only one base station BS and one relay RL are shown for the sake of clarity but in practice the wireless cellular telecommunication network comprises a large number of base stations BS and relays RL.

The terminal TE is for example a mobile phone, a personal digital assistant, a personal computer.

In the FIG. 1, only one terminal TE is shown for the sake of clarity but in practice the wireless cellular telecommunication network comprises a large number of terminals TE.

Figure 2:
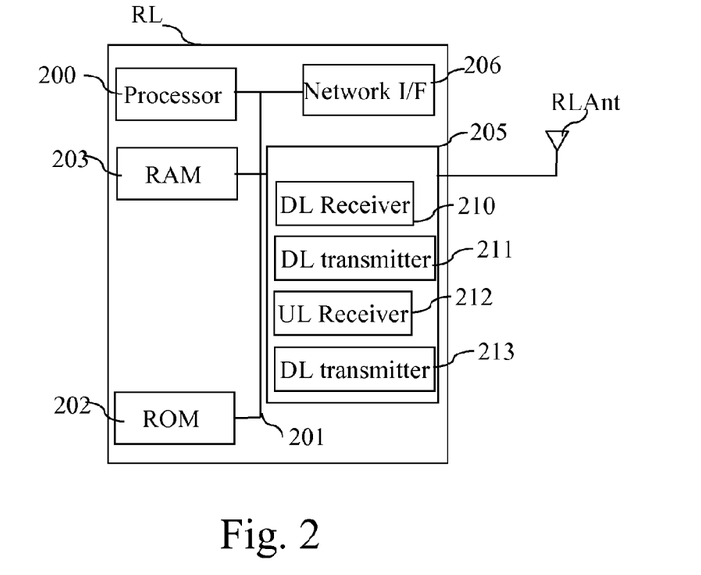
FIG. 2 is a diagram representing the architecture of a relay in which the present invention is implemented.

FIG. 2 is a diagram representing the architecture of a relay in which the present invention is implemented.

Figure 7:
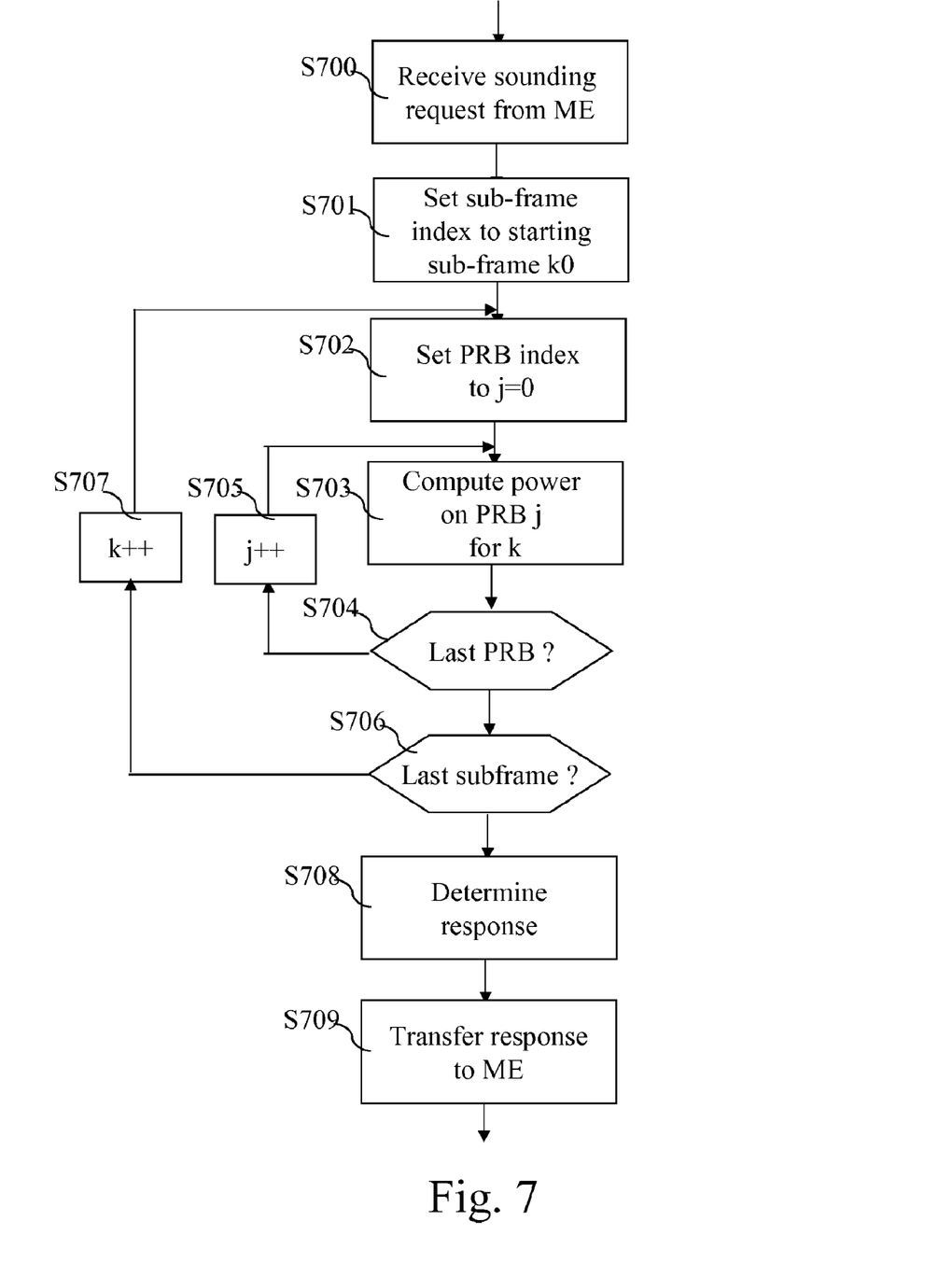
FIG. 7 discloses an example of an algorithm executed by the relay according to a first mode of realisation of the present invention.
Figure 8:
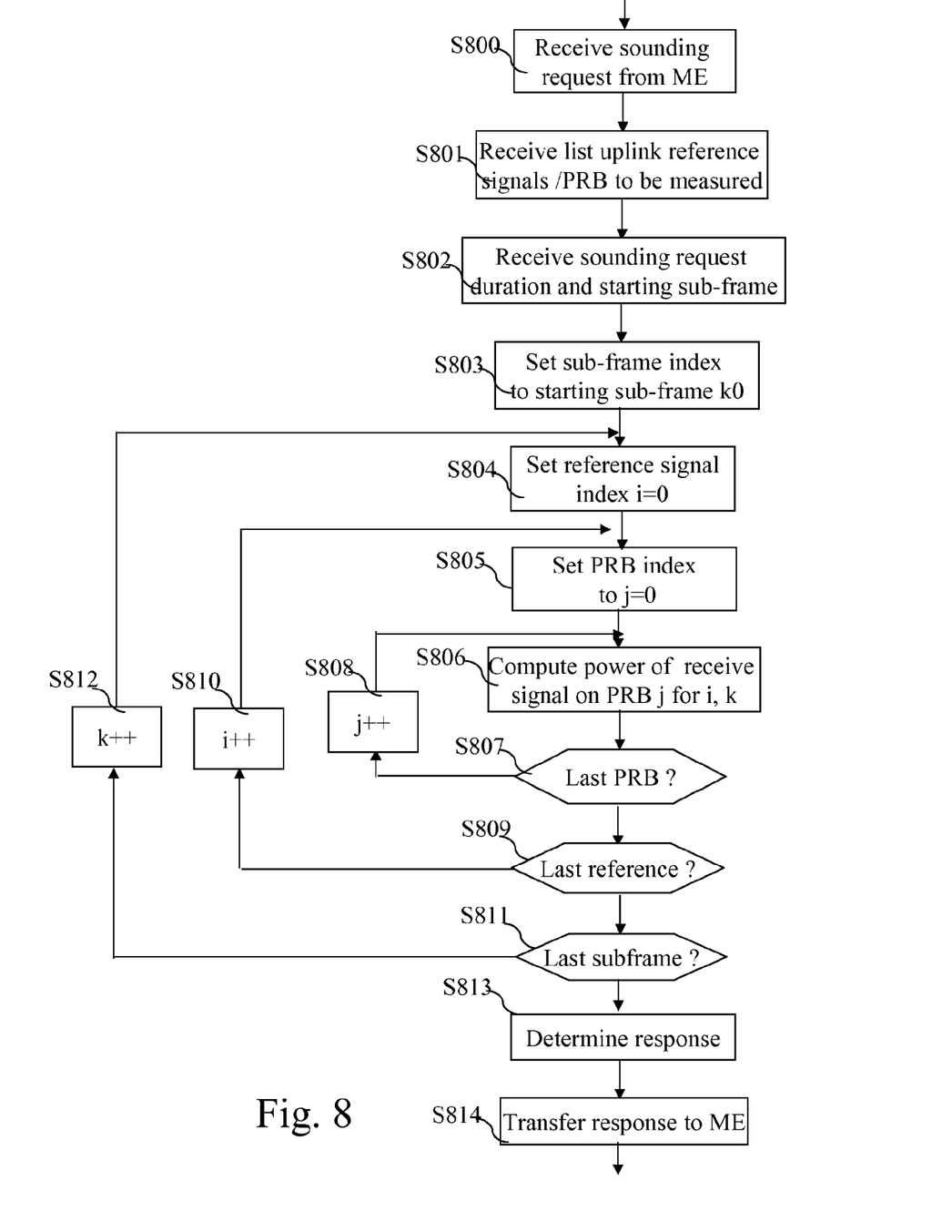
FIG. 8 discloses an example of an algorithm executed by the relay according to a second mode of realisation of the present invention.

The relay RL has, for example, an architecture based on components connected together by a bus 201 and a processor 200 controlled by the program as disclosed in the FIG. 7 or 8.

The bus 201 links the processor 200 to a read only memory ROM 202, a random access memory RAM 203, a network interface 206 and a wireless interface 205.

The memory 203 contains registers intended to receive variables and the instructions of the program as disclosed in the FIG. 7 or 8.

The processor 200 controls the operation of the wireless interface 205.

The read only memory 202 contains instructions of the program as disclosed in the FIG. 7 or 8, which are transferred, when the relay RL is powered on, to the random access memory 203.

The network interface 206 is for example a DSL (Digital Subscriber Line) modem, or an ISDN (Integrated Services Digital Network) interface, etc. Through such interface, the relay RL may transfer messages to the management entity ME and/or receive message from the management entity ME.

The wireless interface 205 enables the relay RL to transfer and/or receive signals or messages to/from the base station BS and to/from the at least one terminal TE included in the list of at least one terminal TE.

The wireless interface 205 may comprise a downlink reception module 210 which receives signals transferred by at least one base station BS, may comprise a downlink transmission module 211 which transfers signals to at least one terminal TE, may comprise an uplink reception module 212 which receives signals transferred by at least one terminal TE and may comprise an uplink transmission module 213 which transfer signals to at least one base station BS.

Figure 3:
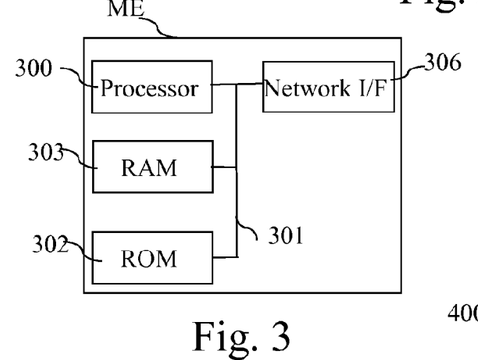
FIG. 3 is a diagram representing the architecture of a management entity in which the present invention is implemented.

FIG. 3 is a diagram representing the architecture of a management entity in which the present invention is implemented.

Figure 5:
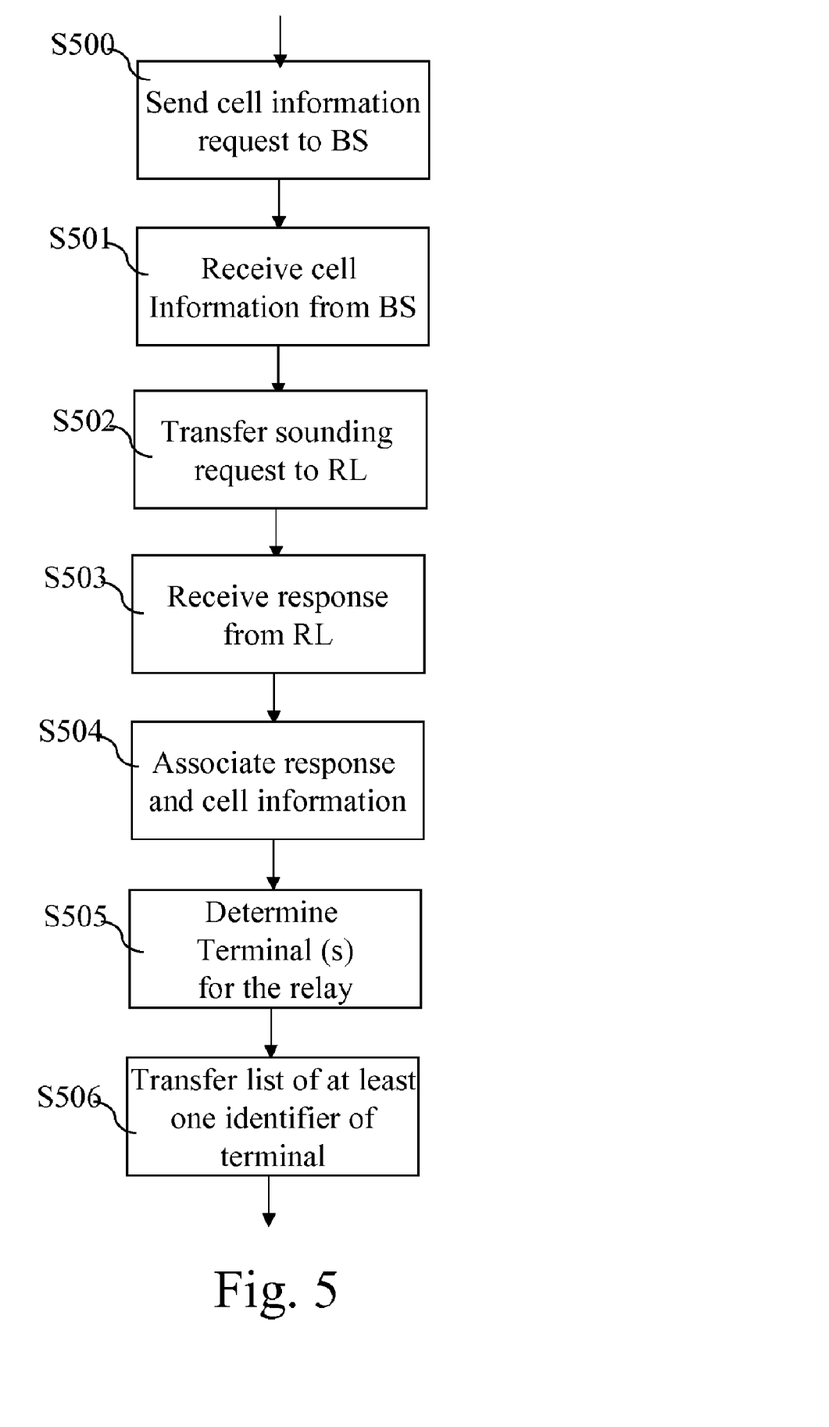
FIG. 5 discloses an example of an algorithm executed by the management entity according to the present invention.

The management entity ME has, for example, an architecture based on components connected together by a bus 301 and a processor 300 controlled by the program as disclosed in the FIG. 5.

The bus 301 links the processor 300 to a read only memory ROM 302, a random access memory RAM 303 and a network interface 306.

The memory 303 contains registers intended to receive variables and the instructions of the program related to the algorithm as disclosed in the FIG. 5.

The processor 300 controls the operation of the network interface 306.

The read only memory 302 contains instructions of the programs related to the algorithm as disclosed in the FIG. 5, which are transferred, when the management entity ME is powered on, to the random access memory 303.

The management entity ME may be connected to the telecommunication network TN through the network interface 306. For example, the network interface 306 is a DSL (Digital Subscriber Line) modem, or an ISDN (Integrated Services Digital Network) interface, etc. Through such interface, the management entity ME may transfer messages to at least one relay RL and/or to at least one base station BS and/or receive messages from at least one relay RL and/or from at least one base station BS.

It has to be noted here that when the management entity ME is included in a base station BS, the processor 300, the memory 302, the random access memory RAM 303 and the network interface 306 may be the ones of the base station BS.

Figure 4:
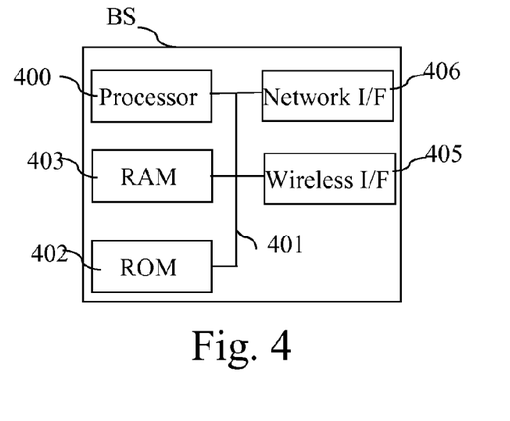
FIG. 4 is a diagram representing the architecture of a base station in which the present invention is implemented.

FIG. 4 is a diagram representing the architecture of a base station in which the present invention is implemented.

Figure 6:
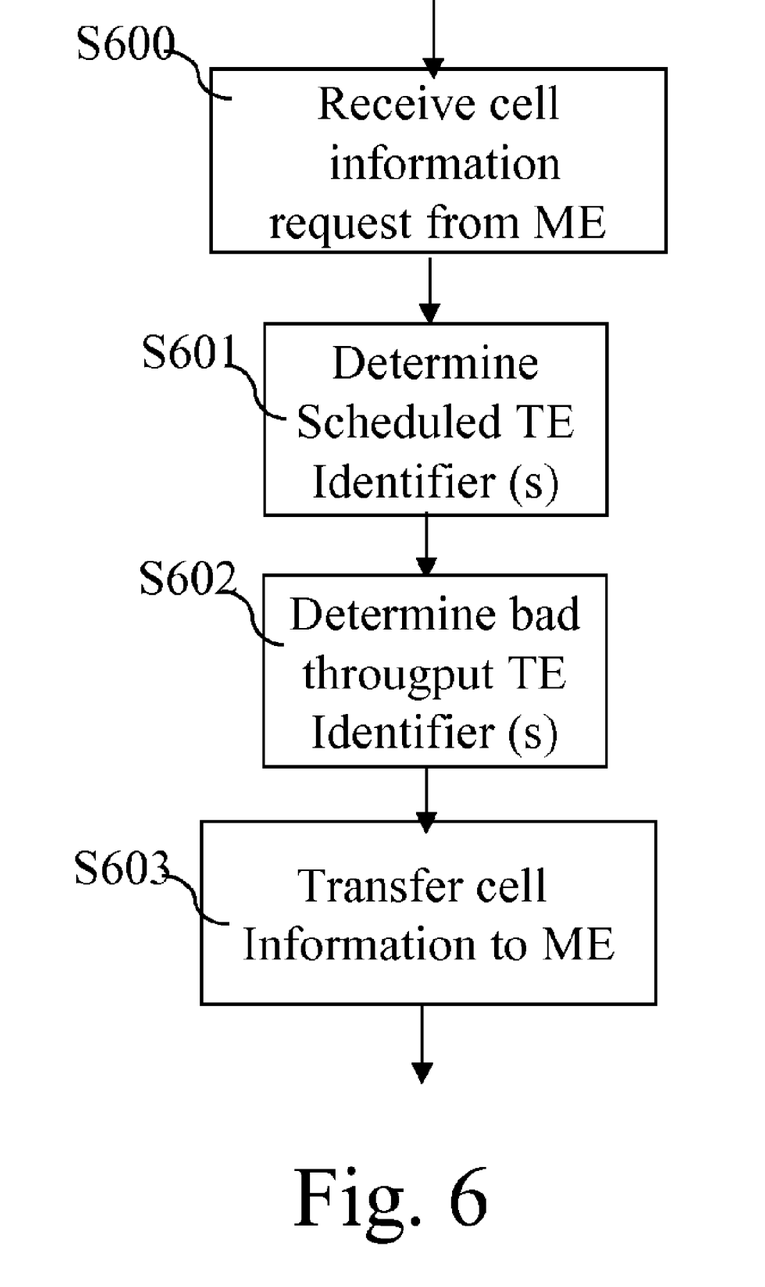
FIG. 6 discloses an example of an algorithm executed by the base station according to the present invention.

The base station BS has, for example, an architecture based on components connected together by a bus 401 and a processor 400 controlled by the program as disclosed in the FIG. 6.

The bus 401 links the processor 400 to a read only memory ROM 402, a random access memory RAM 403, a wireless interface 405 and a network interface 406.

The memory 403 contains registers intended to receive variables and the instructions of the program related to the algorithm as disclosed in the FIG. 6.

The processor 400 controls the operation of the network interface 406 and of the wireless interface 405.

The read only memory 402 contains instructions of the programs related to the algorithm as disclosed in the FIG. 6, which are transferred, when the base station BS is powered on, to the random access memory 403.

The base station BS is connected to the telecommunication network TN through the network interface 406. For example, the network interface 406 is a DSL (Digital Subscriber Line)

modem, or an ISDN (Integrated Services Digital Network) interface, etc. Through such interface, the base station BS may transfer messages to at least one management entity ME or to core network devices CN which manage the wireless cellular telecommunication network.

The wireless interface 405 comprises at least a downlink transmission module which transfers signals to at least one terminal TE relayed or not by the relay RL and an uplink reception module which receives signals transferred by at least one terminal TE, relayed or not by the relay RL.

FIG. 5 discloses an example of an algorithm executed by the management entity according to the present invention.

More precisely, the present algorithm is executed periodically or on particular event by the processor 300 of the management entity ME.

When the management entity ME manages relays RL included into one cell of one base station BS, the present algorithm is executed in parallel for each relay RL comprised in the cell of the base station BS.

When the management entity ME manages relays RL included into cells of plural base stations BS, the present algorithm is executed in parallel for each relay RL comprised in the cell of each base station BS.

In a variant, the processor 300 executes the steps S500 and S501 once, for all relays RL comprised in the cell of the base station BS or for all relays RL comprised in the cell of each base station BS. The steps S502 to S506 are executed in parallel for each relay RL comprised in the cell of the base station BS or are executed in parallel for each relay RL comprised in the cell of each base station BS.

At step S500, the processor 300 commands the transfer through the network interface I/F 306 of a message requesting cell information to the base station BS.

The message requesting cell information may or may not identify resources like physical resource blocks and/or reference signals.

At next step S501, the processor 300 receives the cell information from the base station BS.

The cell information may comprise information identifying each terminal TE to which each of these physical resource blocks and/or each of these reference signals identified in the message requesting cell information is allocated.

The cell information may comprise information identifying at least a part of the Physical Resource Blocks PRB or each physical resource blocks PRB allocated by the base station BS to at least a part of the terminals TE handled by the base station BS and information identifying the terminal TE to which each of these physical resource blocks PRB is allocated.

The physical resource blocks PRB are physical resource blocks of the downlink and/or of the uplink channel. Preferably, the physical resource blocks PRB are physical resource blocks of the uplink channel.

The cell information may comprise information identifying each physical resource block PRB allocated by the base station BS to each terminal TE handled by the base station BS which experiences bad data rates and information identifying the terminal TE to which each of these physical resource blocks is allocated.

A terminal TE which experiences bad data rates is for example a terminal TE for which the number of packet retransmissions is upper than a predetermined number over a given period of time or a terminal TE experiences bad data rates when the channel quality measurements fed back by the terminal TE to the base station BS, or measured by the base station BS are lower than a predetermined threshold.

More particularly, the cell information may comprise information identifying each physical resource blocks PRB allocated by the base station BS to each terminal TE handled by the base station BS which experiences bad data rates and information identifying the terminal TE to which the physical resource block is allocated for at least one sub-frame.

A sub-frame is an elementary time period during which at least one physical resource block is allocated to a terminal TE.

According to the second mode of realisation, the cell information further comprises, for each terminal TE, for each identified physical resource block PRB and for each sub-frame, at least one identifier of a reference signal allocated by the base station BS to the terminal TE.

The reference signal is as example a pilot signal allocated to the terminal TE, as example for channel estimation purpose.

At next step S502, the processor 300 commands the transfer of a sounding requests to the relay RL.

The sounding request may comprise information identifying at least one physical resource block PRB and/or identifying at least one reference signal and/or identifying the cell of the base station BS.

The sounding request may comprise information identifying at least one physical resource block PRB and/or identifying at least one reference signal and/or identifying the cell of the base station BS and information identifying at least one sub-frame, for which measurements have to be executed by the relay RL.

It has to be noted here that in a variant, the order of execution of the steps S501 and S502 may be changed.

At next step S503, the processor 300 detects the reception of a response to the sounding request.

The response of the sounding request may comprise information identifying the M physical resource blocks PRB and/or reference signals on which a characteristic of the level of received signals measured by the relay RL are the M highest.

The characteristic of the level of received signals is as example the signal power strength of the received signals measured or not after any signal processing like a correlation operation.

The response of the sounding request may comprise, for each sub-frame identified in the sounding request, information identifying the M physical resource blocks PRB and/or reference signals on which the characteristics of the level of received signals measured by the relay RL are the M highest.

The M physical resource blocks PRB and/or reference signals may be M physical resource blocks PRB and/or reference signals on which the characteristic of the level of received signals measured by the relay RL are the M highest among the characteristics of the level of received signals measured by the relay RL on each physical resource block and/or reference signal for each sub-frame identified in the sounding request.

It has to be noted here that M is comprised between one and the total amount of physical resource blocks.

The response of the sounding request may comprise, for each sub-frame identified in the sounding request, information identifying each physical resource block PRB and/or reference signal on which the characteristic of the level of received signals measured by the relay RL is upper than a given value.

The response of the sounding request may comprise the characteristic of the level of received signals measured by the relay RL on the physical resource blocks identified in the sounding request and/or the characteristic of the level of received signals of the reference signals identified in the sounding request for at least one sub-frame or for each sub-frame identified in the sounding request.

The response of the sounding request may comprise the characteristic of the level of received signals measured by the relay RL on the physical resource blocks identified in the response of the sounding request and/or the characteristic of the level of received signals of the reference signals identified in the response of the sounding request for at least one sub-frame or for each sub-frame identified in the sounding request.

At next step S504, the processor 300 associates the response received at step S503 with the cell information received at step S501.

The processor 300 associates with each physical resource block PRB and/or reference signal identified in the response of the sounding request, the identifier of the terminal TE to which the physical resource block PRB or reference signal has been allocated for at least one sub-frame or for each sub-frame identified in the sounding request.

At next step S505, the processor 300 determines each terminal TE for which signals transferred between the at least one terminal TE and a base station BS of a wireless cellular telecommunication network have to be relayed by the relay RL.

Each terminal TE for which signals transferred between the at least one terminal TE and a base station BS of a wireless cellular telecommunication network have to be relayed by the relay RL may be determined by selecting the identifier of each terminal TE which experiences bad data rates and to which at least one of the physical resource blocks and/or of the reference signals identified in the response of the sounding request has been allocated.

Each terminal TE for which signals transferred between the at least one terminal TE and a base station of a wireless cellular telecommunication network have to be relayed by the relay RL may be determined by selecting the identifier of each terminal TE to which at least one of the physical resource blocks and/or of the reference signals identified in the sounding request have been allocated and for which the characteristics of the level of received signals measured by the relay RL are upper than a given value. The characteristics of the level of received signals measured by the relay RL for a terminal TE may be obtained by averaging the received signal strengths over all physical resource blocks and/or all reference signals allocated to the terminal TE during the sub-frames identified in the sounding request.

At next step S506, the processor 300 commands the transfer of a list of at least one terminal TE to the relay RL.

The list of at least one terminal TE may comprise the identifier of each terminal TE for which signals transferred between the terminal TE and the base station BS have to be relayed by the relay RL.

The list of at least one terminal TE may comprise the identifier of each terminal TE for which the relay RL has to start to relay signals transferred between the terminal TE and the base station BS.

The list of at least one terminal TE may comprise the identifier of each terminal TE for which the relay RL has to stop to relay signals transferred between the terminal TE and the base station BS.

FIG. 6 discloses an example of an algorithm executed by the base station according to the present invention.

More precisely, the present algorithm is executed by the processor 400 of the base station BS.

At step S600, the processor 400 detects the reception of a cell information request message from the management entity ME.

The message requesting cell information may or may not identify resources like physical resource blocks or reference signals.

At next step S601, the processor 400 obtains the identifiers of the terminals TE to which the physical resource blocks PRB and/or reference signals identified in the cell information request message have been allocated by the base station BS or obtains the identifiers of the terminals TE to which the physical resource blocks PRB and/or reference signals have been allocated by the base station BS.

At next step S602, the processor 400 determines the identifiers of the terminals TE handled by the base station BS which experience bad data rates.

At next step S603, the processor 400 commands the transfer of the cell information from the base station BS.

The cell information may comprise information identifying each terminal TE to which each of the physical resource blocks PRB and/or each of the reference signals identified in the message requesting cell information is allocated.

The cell information may comprise information identifying at least a part of the physical resource blocks PRB or each physical resource block PRB allocated by the base station BS to at least a part of the terminals TE handled by the base station BS and information identifying the terminal TE to which each of these physical resource blocks PRB is allocated.

The cell information may comprise information identifying each physical resource blocks PRB allocated by the base station BS to each terminal TE handled by the base station BS which experiences bad data rates and information identifying the terminal TE to which each of these physical resource blocks PRB is allocated.

More particularly, the cell information may comprise information identifying each physical resource blocks PRB allocated by the base station BS to each terminal TE handled by the base station BS which experiences bad data rates and information identifying the terminal TE to which the physical resource block is allocated for at least one sub-frame.

According to the second mode of realisation, the cell information further comprises, for each terminal TE, for each identified physical resource block PRB and for each sub-frame, at least one identifier of a reference signal allocated by the base station BS to the terminal TE.

FIG. 7 discloses an example of an algorithm executed by the relay according to the first mode of realisation of the present invention.

More precisely, the present algorithm is executed by the processor 200 of the relay RL.

At step S700, the processor 200 detects the reception of a sounding request message transferred by the management entity ME.

The sounding request may comprise information identifying at least one physical resource block PRB and/or identifying the cell of the base station BS.

The sounding request may comprise information identifying at least one physical resource block PRB and/or identifying the cell of the base station BS and information identifying at least one sub-frame, for which measurements have to be executed by the relay RL.

At next step S701, the processor 200 sets, if at least one sub-frame is identified in the sounding request, the sub-frame index k to the value k0 of the identified sub-frame in the sounding request or to the value k0 of the first identified sub-frame in the sounding request.

At next step S702, the processor 200 sets the physical resource block PRB index j to the null value.

At next step S703, the processor 200 commands the wireless interface 205 to compute the characteristic of the level of received signal or signals received in the physical resource block PRB of index j for the sub-frame k.

The received signals in the physical resource block PRB may be transferred by plural terminals TE handled by different base stations BS.

For example, the characteristic of the level of received signal or signals received in the physical resource block PRB is the power strength of the signals received in the radio physical resource block PRB.

It has to be noted here that, as the physical resource block allocation may vary in time, the power measurement is preferably performed on a single sub-frame in order to avoid that the received powers from several terminals TE handled by the base station BS are averaged.

If the wireless cellular telecommunication network has synchronized uplink channels using for example timing advance mechanism for each terminal TE, the base station BS may also assign a timing advance value to the relay RL. The relay RL assumes that the terminals TE, from which it receives strong signals, are close, i.e., they have almost the same timing-advance value and that the propagation time from these terminals to the relay RL is low. The relay RL considers that the uplink sub-frames in which the terminals TE send signals are aligned at its receiver with the uplink sub-frames it transmits.

If the base station BS doesn't assign a timing advance value to the relay RL, the relay RL assumes that the terminals TE, from which it receives strong signals, are close, i.e., the propagation time from these terminals TE to the relay RL is low.

The relay RL considers then that the uplink sub-frames in which the terminals TE send signals are aligned. The relay RL can detect the variation of the power strength of the signal received on each physical resource block PRB, due to new uplink allocations in order to detect the sub-frame timing.

If the wireless cellular telecommunication network has not synchronized uplink channels, some preamble may be determined for each terminal TE and inserted in the uplink signal transferred by each terminal TE. The relay RL can use this preamble to synchronise with the terminals TE it has to monitor.

At next step S704, the processor 200 checks if a measurement at step 703 has been executed for each physical resource block PRB to monitor.

The physical resource blocks to monitor may be all the available physical resource blocks PRB for the uplink channel or the physical resource blocks PRB identified in the sounding request received at step S700.

If each physical resource block PRB has been monitored, the processor 200 moves to step S706. Otherwise, the processor 200 moves to step S705.

At step S705, the processor 200 increments the index j by one and returns to step S703.

At step S706, the processor 200 checks if each sub-frame identified in the sounding request received at step S700 has been processed.

If each sub-frame identified in the sounding request received at step S700 has been processed, the processor 200 moves to step S708. Otherwise, the processor 200 moves to step S707.

At step S707, the processor 200 increments the index k by one and returns to step S702.

At step S708, the processor 200 determines the response to the sounding request received at step S700.

The response of the sounding request may comprise information identifying the M physical resource blocks PRB on which a characteristic of the level of received signals measured by the relay RL are the M highest.

The response of the sounding request may comprise, for each sub-frame identified in the sounding request, information identifying the M physical resource blocks PRB on which the characteristic of the level of received signals measured by the relay RL are the M highest.

The M physical resource blocks PRB may be M physical resource blocks PRB on which the characteristics of the level of received signals measured by the relay RL are the M highest among the characteristics of the level of received signals measured by the relay RL on each physical resource block for each sub-frame identified in the sounding request.

The response of the sounding request may comprise, for each sub-frame identified in the sounding request, each characteristic of the level of received signals measured by the relay RL which is upper than a given value.

The response of the sounding request may comprise the characteristic of the level of received signals measured by the relay RL on the physical resource blocks identified in the sounding request for at least one sub-frame or for each sub-frame identified in the sounding request.

The response of the sounding request may comprise the characteristic of the level of received signals measured by the relay RL on the physical resource blocks identified in the response of the sounding request.

At next step S709, the processor 200 commands the transfer of the response of the sounding request to the management entity ME through the wireless interface 205 or through the network interface 206.

FIG. 8 discloses an example of an algorithm executed by the relay according to the second mode of realisation of the present invention.

More precisely, the present algorithm is executed by the processor 200 of the relay RL.

At step S800, the processor 200 detects the reception of a sounding request message transferred by the management entity ME.

At next step S801, the processor 200 detects the reception of information transferred by the management entity ME. The information identifies at least one physical resource block PRB and at least one reference signal or identifies at least one reference signal.

Each identified reference signal is a signal uniquely allocated to a terminal TE in at least the cell of the base station BS. The identified reference signal is for example a pilot signal.

At next step S802, the processor 200 detects the reception of information indicating the sounding request duration and the indicia k0 of the first sub-frame on which the sounding has to be conducted.

The sounding request duration may be a time period or may be represented as a number of sub-frames.

At next step S803, the processor 200 sets the sub-frame index k to the value k0.

At next step S804, the processor 200 sets the reference signal index i to the null value.

At next step S805, the processor 200 sets the physical resource block PRB index j to the null value.

At next step S806, the processor 200 commands the wireless interface 205 to compute the characteristic of the level of received reference signal i received in the physical resource block PRB of index j for the reference signal i and for the sub-frame k.

As plural terminals TE handled by different base stations BS may transfer signal in the physical resource block j for the sub-frame k, the identification of the reference signal i enables to differentiate the reference signal i from other signals.

For example, the characteristic of the level of reference signal i received in the physical resource block PRB is the power strength of the correlation of the signals received in the radio physical resource block PRB with the reference signal i.

At next step S807, the processor 200 checks if a measurement at step 806 has been executed for each physical resource block PRB to monitor.

The physical resource blocks PRB to monitor may be all the available physical resource blocks PRB for the uplink channel or the physical resource blocks identified at step S801.

If each physical resource block PRB has been monitored, the processor 200 moves to step S809. Otherwise, the processor 200 moves to step S808.

At step S808, the processor 200 increments the index j by one and returns to step S806.

At step S809, the processor 200 checks if each reference signal identified at step S801 has been processed.

If each reference signal has been processed, the processor 200 moves to step S811. Otherwise, the processor 200 moves to step S810.

At step S810, the processor 200 increments the index i by one and returns to step S805.

At step S811, the processor 200 checks if the sounding is completed.

If the sounding is completed, the processor 200 moves to step S813. Otherwise, the processor 200 moves to step S812.

At step S812, the processor 200 increments the index k by one and returns to step S804.

At step S813, the processor 200 determines the response to the sounding request received at step S700.

The response of the sounding request may comprise information identifying the M physical resource blocks PRB and/or reference signals on which a characteristic of the level of received reference signals measured by the relay RL are the M highest.

The response of the sounding request may comprise, for each sub-frame identified in the sounding request, information identifying the M physical resource blocks PRB and/or reference signals on which the characteristics of the level of received reference signals measured by the relay RL are the M highest.

The M physical resource blocks PRB and/or reference signals may be M physical resource blocks PRB and/or reference signals on which the characteristics of the level of received reference signals measured by the relay RL are the M highest among the characteristics of the level of received reference signals measured by the relay RL on reference signal or on each physical resource block PRB and reference signal for each sub-frame identified in the sounding request.

The response of the sounding request may comprise, for each sub-frame identified in the sounding request, each characteristic of the level of received reference signals measured by the relay RL which is upper than a given value.

The response of the sounding request may comprise the characteristic of the level of received reference signals measured by the relay RL on the physical resource blocks identified in the sounding request and/or the characteristic of the level of received reference signals of the reference signals identified in the sounding request for at least one sub-frame or for each sub-frame identified in the sounding request.

The response of the sounding request may comprise the characteristic of the level of received reference signals measured by the relay RL on the physical resource blocks identified in the response of the sounding request and/or the characteristic of the level of received reference signals identified in the response of the sounding request.

At next step S814, the processor 200 commands the transfer of the response to the management entity ME through the wireless interface 205 or through the network interface 206.

Naturally, many modifications can be made to the embodiments of the invention described above without departing from the scope of the present invention.

The invention claimed is:

1. A method for determining at least one terminal for which signals transferred between the at least one terminal and a base station of a wireless cellular telecommunication network have to be relayed by a relay, the base station allocating resources of the wireless cellular telecommunication network, the method comprising, executed by a management entity:
   receiving from the base station, information indicating to which terminal or terminals at least a part of the resources are allocated;
   receiving from the relay, a list of indicators of resources; and
   determining the at least one terminal for which signals transferred between the at least one terminal and the base station have to be relayed by the relay according to the information indicating to which terminal or terminals at least a part of the resources are allocated and to the list of indicators of resources.

2. The method according to claim 1, wherein the resources are physical resource blocks and/or reference signals.

3. The method according to claim 2, further comprising, executed by the management entity prior to the reception of the list of indicators, transferring a sounding request to the relay.

4. The method according to claim 2, wherein the list of indicators comprises M indicators of physical resource blocks on which a characteristic of the level of received signals measured by the relay are the M highest, or the list of indicators comprises the indicators of each physical resource block on which the characteristic of the level of received signals measured by the relay is greater than a given value.

5. The method according to claim 3, wherein the sounding request identifies at least one resource.

6. The method according to claim 5, wherein the list of indicators comprises M indicators of physical resource blocks identified in the sounding request on which a characteristic of the level of received signals measured by the relay are the M highest, or the list of indicators comprises the indicators of each physical resource block identified in the sounding request on which the characteristic of the level of received signals measured by the relay is greater than a given value, or the list of indicators comprises M indicators of reference signals identified in the sounding request on which a characteristic of the level of received reference signals measured by the relay are the M highest, or the list of indicators comprises the indicators of each reference signal identified in the sounding request on which the characteristic of the level of received reference signals measured by the relay is greater than a given value.

7. The method according to claim 5, wherein the list of indicators comprises characteristics of the level of received signals measured by the relay on at least a part of the physical resource blocks which are identified in the sounding request and/or characteristics of the level of at least a part of received reference signals which are identified in the sounding request.

8. The method according to claim 7, wherein the list of indicators comprises the M highest characteristics of the level of received signals measured by the relay on the physical resource blocks identified in the sounding request or the M highest characteristics of the level of received reference signals which are identified in the sounding request or the M highest characteristics of the level of received reference signals identified in the sounding request measured by the relay on the physical resource blocks identified in the sounding request, or the list of indicators comprises characteristics of the level of received signals measured by the relay on the physical resource blocks identified in the sounding request which are greater than a given value or the characteristics of the level of received reference signals which are identified in the sounding request which are greater than the given value or the characteristics of the level of received reference signals identified in the sounding request measured by the relay on the physical resource blocks identified in the sounding request which are greater than the given value.

9. The method according to claim 1, wherein the resources are allocated for at least a time duration and in that information indicating to which terminal or terminals at least a part of the resources are allocated indicate to which terminal or terminals at least a part of the resources are allocated for the or each time duration and the list of indicators of resources is received for one or each time duration.

10. The method according to claim 1, wherein the information indicating to which terminal or terminals at least a part of the resources are allocated is information indicating to which terminal or terminals which experiences or experience bad data rates at least a part of the resources are allocated.

11. Method according to claim 1, further comprising, executed by the management entity, transferring a message to the relay, the message comprising information enabling the relay to determine at least one terminal for which signals transferred between the at least one terminal and the base station have to be relayed by the relay.

12. A non-transitory computer readable medium comprising computer executable instructions or portions of code for implementing the method according to claim 1, when the computer executable instructions or portions of code are executed on a programmable device.

13. A management entity configured to determine at least one terminal for which signals transferred between the at least one terminal and a base station of a wireless cellular telecommunication network have to be relayed by a relay, the base station allocating resources of the wireless cellular telecommunication network, the management entity comprising:
- means for receiving from the base station, information indicating to which terminal or terminals at least a part of the resources are allocated;
- means for receiving from the relay, a list of indicators of resources; and
- means for determining the at least one terminal for which signals transferred between the at least one terminal and the base station have to be relayed by the relay according to the information indicating to which terminal or terminals at least a part of the resources are allocated and to the list of indicators of resources.

\* \* \* \* \*